United States Patent [19]
Grunwell

[11] Patent Number: 5,410,587
[45] Date of Patent: Apr. 25, 1995

[54] ULTRASONIC RADIOTELEPHONE FOR AN AUTOMOBILE

[75] Inventor: Randall L. Grunwell, Suwanee, Ga.

[73] Assignee: Matsushita Communication Industrial Corp. of America, Peachtree City, Ga.

[21] Appl. No.: 24,722

[22] Filed: Mar. 1, 1993

[51] Int. Cl.$^6$ ............................................. H04M 11/00
[52] U.S. Cl. ...................................... 379/56; 379/58; 455/11.1
[58] Field of Search ...................... 379/56, 58, 59, 388; 455/54.1, 151.2, 11.1

[56] References Cited

U.S. PATENT DOCUMENTS

| | | | |
|---|---|---|---|
| 4,291,411 | 9/1981 | Müller et al. | 455/88 |
| 4,396,799 | 8/1983 | Franzen et al. | 379/388 |
| 4,542,262 | 9/1985 | Ruff | 379/56 |
| 4,850,006 | 7/1989 | Sasaki et al. | 379/58 |
| 4,860,337 | 8/1989 | Shimura | 379/58 |
| 4,969,180 | 11/1990 | Watterson et al. | 379/58 |

FOREIGN PATENT DOCUMENTS 2648199  4/1978  Germany ............................. 379/56

OTHER PUBLICATIONS

World Publication, WO92/10046, "Light-Linked Cellular Telephone" Jun. 1992, Barker et al.

Primary Examiner—Curtis Kuntz
Assistant Examiner—Dwayne D. Bost
Attorney, Agent, or Firm—Jones & Askew

[57] ABSTRACT

A car radiotelephone system having one or more wireless handsets communicating voice and control information via an ultrasonic link with a stationary unit connected functionally to a base station. The base unit (1) is connected by two cables, an audio-out cable (a) connected to the radio frequency receiver (2) and an audio-in cable (b) connected to the radio frequency transmitter (3), to a stationary transmitting/receiving unit (4). The stationary transmitting/receiving unit consists of two summing amplifiers, transmitting summing amplifier (5) and receiving summing amplifier (6), and any number of ultrasonic transmitters and receivers. Likewise, any number of handsets can be used. The handsets (15) comprise an ultrasonic receiver (19), an ultrasonic transmitter (20), transmitter and receiver circuitry (27), a keypad (28), display circuitry (29), microphone (30), earpiece/speaker (31), and a rechargeable battery and ringer. Each ultrasonic transmitter in the stationary unit and the handsets operate at a different frequency or other independent non-interfering methods so as to permit full duplex transmission. In order to insure that the transmission is obstacle free, the ultrasonic receiving and transmitting units in a handset are mounted on the top most side of the handset, pointing upward, and the stationary transmitting/receiving unit (4) is preferably mounted in the dome light housing unit (32).

4 Claims, 3 Drawing Sheets

ULTRASONIC RADIOTELEPHONE FOR AN AUTOMOBILE

TECHNICAL FIELD

The present invention relates to automobile radiotelephones and more particularly to a wireless ultrasonic handset to be used with an automobile radiotelephone system.

BACKGROUND OF THE INVENTION

The prior art contains numerous automobile radiotelephone designs. Likewise, the use of a wireless ultrasonic link in communications systems is known in the art. Examples of ultrasonic communications systems include U.S. Pat. No. 4,969,180 to Watterson, et al. and U.S. Pat. No. 4,542,262 to Ruff. Attempts to combine radiotelephone technology with wireless ultrasonic technology, however, have met with limited success, in part, because they have been based on half duplex systems that prevent simultaneous transmission between the parties. Further, there are also distortion problems and the space constraints of the passenger compartment that must be addressed.

One attempt to resolve these problems is found in U.S. Pat. No. 4,291,411 to Müller, et al. Müller connected the base unit of a radiotelephone to a secondary unit mounted in the back range of the interior of an automobile which communicated with a handset via either a half duplex infrared or ultrasonic link. The Müller design, however, imposes limits on user position and on the clarity of transmission because of the location of this secondary unit. The Müller design also prohibits simultaneous communication by the use of a half duplex system. Further, infrared transmission has proved to be less desirable than ultrasonic transmission in an automobile because it cannot be used in a full duplex system and because of distortion caused by high passenger compartment temperatures.

Other drawbacks with current radiotelephone systems include the inability of more than one passenger to participate in the conversation without having to pass the handset. Attempts to resolve this problem through the use of a loudspeaker/microphone system are ineffective due to the fact that only one of the calling parties may speak at a time and the inherent distortion level present with respect to those passengers in the rear of the passenger compartment. The ability to hear or speak over engine, road and wind noise is obviously limited.

Given that the clarity of an ultrasonic link depends largely on the placement of the secondary unit with respect to the handset, it would be desirable to provide for a wireless car radiotelephone handset which can operate distortion free from any position in the automobile in full duplex mode. Similarly, the use of multiple handsets would permit simultaneous multiparty conversation and eliminate the distortion usually present with the use of a loudspeaker/microphone system.

SUMMARY OF THE INVENTION

It is the object of the subject invention to incorporate the use of automobile radiotelephones and the use of an ultrasonic link in such a manner as to provide distortion-free, multi-party, full duplex wireless communications within an automobile. This is accomplished by connecting a base unit, preferably located in the trunk of an automobile, to a stationary transmitting/receiving (transceiver) unit preferably located in the dome light housing unit. This location provides for clear transmission to and from any location in the passenger compartment. The location of the stationary unit provides for obstacle-free communication with the handset, which also has an ultrasonic transmitting/receiving unit on the upper end of the handset so that, in normal operation, the unit is closest to the dome light unit. Further, call sharing through the use of multiple individual handsets is possible, thereby permitting simultaneous communication through the use of a full duplex system and reducing the distortion level present as compared with the use of a microphone/loudspeaker system for multiple parties.

In the preferred embodiment, the handset comprises several to all of the following: a rechargeable battery, receiving and transmitting ultrasonic transducers (such as a piezo-electric devices), amplifiers, transmitter and receiver circuitry, and audio, keypad and display circuitry. The handset also has an associated storage cradle which contains a charging unit for the handset's batteries. The cradle may also contain control circuits to provide such functions as ringing and dialing.

The stationary transmitting/receiving unit comprises receive and transmit transducers, amplifiers, transmitter and receiver circuitry and possibly ringer circuits. The signal paths between each handset and the stationary unit are provided by independent, non-interfering methods, such as two different frequencies in the ultrasonic band, time encoding or code encoding. Preferably, the ultrasonic link carries audio signals as well as dial and ring information. More than one person can listen to a call by using multiple handsets and by adding additional non-interfering channels, or by using listen-only handsets.

In summary, the invention is a radiotelephone comprising a base unit, a transmitting/receiving unit, and a handset. The base unit is for receiving outgoing audio signals and transmitting an outgoing radio frequency signal, and for receiving incoming radio frequency signals and providing incoming audio signals. The transmitting/receiving unit is positioned essentially within the passenger compartment of an automobile and functionally connected to the base unit. The transmitting/receiving unit comprises an ultrasonic receiver for receiving incoming ultrasonic signals to provide the outgoing audio signals and an ultrasonic transmitter for receiving the incoming audio signals to provide outgoing ultrasonic signals. The handset comprises a microphone, a speaker, an ultrasonic transmitter for transmitting signals from the microphone as the incoming ultrasonic signals to the transmitting/receiving unit, and an ultrasonic receiver for simultaneously receiving the outgoing ultrasonic signals from the transmitting/receiving unit to provide audio signals to the speaker.

In one embodiment, the invention is a radiotelephone comprising a base unit, a transmitting/receiving unit mounted within the dome light housing unit of an automobile and a handset. The base unit is for receiving outgoing audio signals and transmitting an outgoing radio frequency signal, and for receiving incoming radio frequency signals and providing incoming audio signals. The transmitting/receiving unit mounted within the dome light housing unit of the automobile is functionally connected to the base unit. The transmitting/receiving unit comprises an ultrasonic receiver for receiving incoming ultrasonic signals to provide the outgoing audio signals and an ultrasonic transmitter for receiving the incoming audio signals to provide outgoing ultrasonic signals. The handset comprises a microphone, a speaker, an ultrasonic transmitter located on a predetermined end of the handset for transmitting signals from the microphone as the incoming ultrasonic signals to the transmitting/receiving unit and an ultrasonic receiver located on the predetermined end of the handset for simultaneously receiving the outgoing ultrasonic signals from the transmitting/receiving unit to provide audio signals to the speaker.

In a further embodiment, the invention is a radiotelephone comprising a base unit, a transmitting/receiving unit and a first and second handset. The base unit is for receiving outgoing audio signals and transmitting an outgoing radio frequency signal, and for receiving incoming radio frequency signals and providing incoming audio signals. The transmitting/receiving unit is functionally connected to the base unit. It comprises a first and second ultrasonic receiver for receiving incoming ultrasonic signals to provide the outgoing audio signals and a first and second ultrasonic transmitter for receiving said incoming audio signals to provide outgoing ultrasonic signals. The first and the second handset each comprise a microphone, a speaker, an ultrasonic transmitter for transmitting signals from the microphone as the incoming ultrasonic signals to the transmitting/receiving unit and an ultrasonic receiver for simultaneously receiving the outgoing ultrasonic signals from the transmitting/receiving unit to provide audio signals to the speaker. The first handset communicates with the first ultrasonic transmitter and the first ultrasonic receiver of the transmitting/receiving unit and the second handset communicates with the second ultrasonic transmitter and the second ultrasonic receiver of the transmitter/receiver unit.

A further embodiment of the invention is a handset for a radiotelephone comprising a microphone, an ultrasonic transmitter for transmitting outgoing ultrasonic signals from the microphone, a speaker, and an ultrasonic receiver for receiving incoming ultrasonic signals to provide audio signals to the speaker, the ultrasonic receiver receiving the incoming ultrasonic signals simultaneously with the ultrasonic transmitter transmitting the outgoing ultrasonic signals.

A further embodiment of the invention is a listen only handset for a radiotelephone, consisting essentially of a speaker and an ultrasonic receiver for receiving incoming ultrasonic signals to provide audio signals to the speaker.

Another embodiment of the invention is a radiotelephone system comprising a base unit and a transmitting/receiving unit. The base unit is for receiving outgoing audio signals and transmitting an outgoing radio frequency signal, and for receiving incoming radio frequency signals and providing incoming audio signals. The transmitting/receiving unit is positioned essentially within the passenger compartment of an automobile and is functionally connected to the base unit. It comprises an ultrasonic receiver for receiving incoming ultrasonic signals to provide the outgoing audio signals and an ultrasonic transmitter for receiving the incoming audio signals to provide outgoing ultrasonic signals.

DETAILED DESCRIPTION

Figure 1:
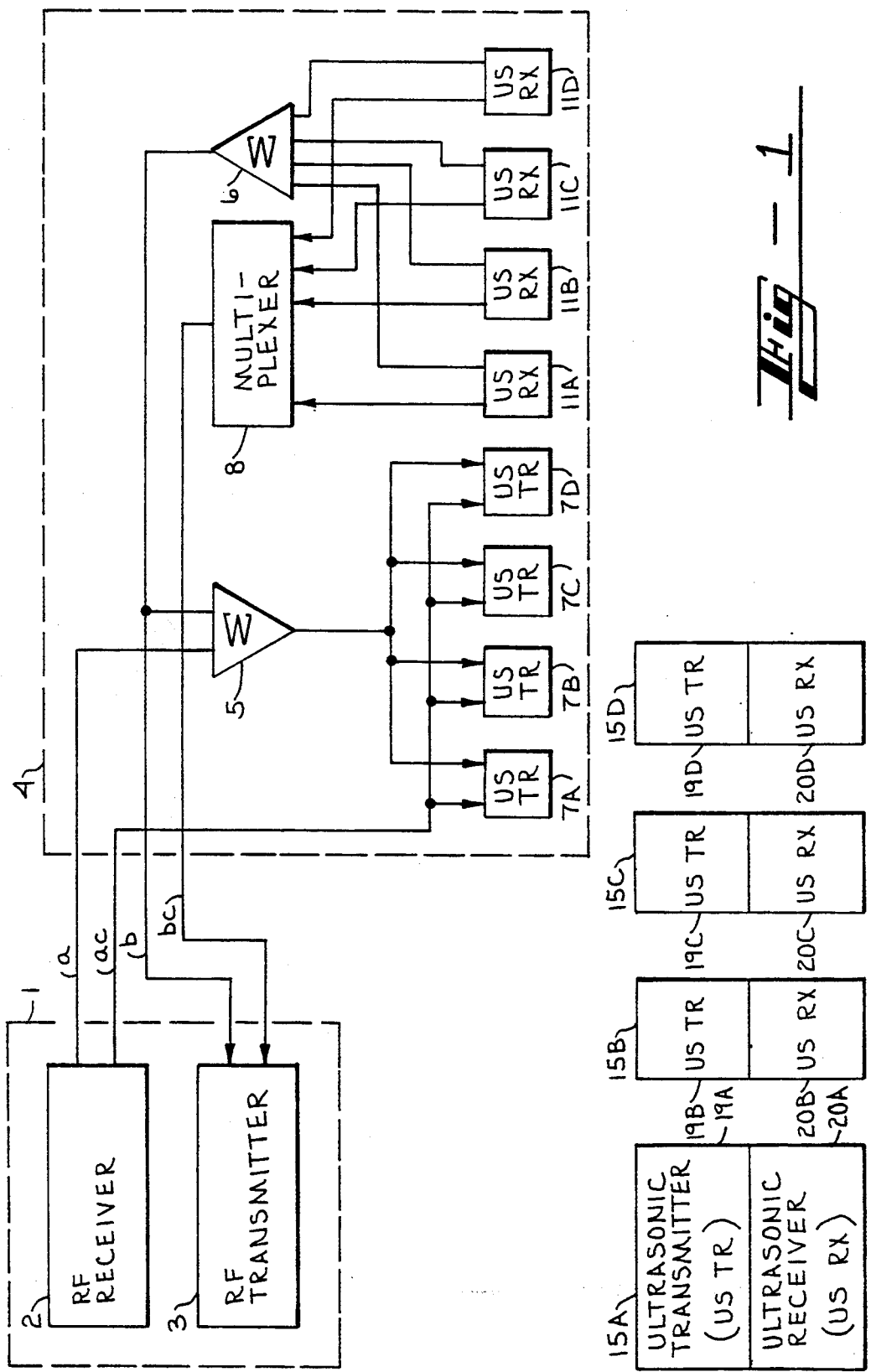
FIG. 1 is a block circuit diagram of the preferred embodiment of the present invention showing the connection between the base unit, the stationary transmitting/receiving unit and handset transmitting/receiving units.

FIG. 1 is a block circuit diagram of the preferred embodiment of the present invention showing the connection between the base unit, the stationary transmitting/receiving unit and handset transmitting/receiving units. The base unit 1 has a receiver 2 for receiving and demodulating signals, including control signals, and a transmitter 3 for modulating and transmitting signals, including control signals. Base unit 1 also has a controller (not shown) for controlling the overall operation of the radiotelephone. The design of a controller which controls the operation of the receiver 2 and the transmitter 3 in response to signals received from the Mobile Telephone Switching Office (not shown) or in response to signals received over paths b and bc is well known in the mobile radio telephone field. Therefore, for clarity of illustration and for convenience in describing the new feature provided by the present invention, the controller is not shown.

The base unit 1 is connected to a stationary transmitting/receiving unit 4 by two cables, an audio-out cable a connected to the radio frequency receiver 2 and an audio-in cable b connected to a stationary transmitting/receiving unit 4 to the radio frequency transmitter 3. The stationary transmitting/receiving unit 4 consists of two summing amplifiers, transmitting summing amplifier 5 and receiving summing amplifier 6, multiplexer 8, and any number of ultrasonic transmitters 7 and receivers 11. In this case, four ultrasonic transmitters 7A-7D are shown, as are four ultrasonic receivers 11A-11D. The audio-out a cable is connected to one input of the transmitting summing amplifier 5. The output of transmitting summing amplifier 5 is then connected to the four ultrasonic transmitters 7A-7D.

Four ultrasonic receivers 11A-11D are connected to inputs of summing amplifier 6. The output of summing amplifier 6 is then connected by audio-in cable b to another input of summing amplifier 5 and also to the audio input of the radio frequency transmitter 3. Each ultrasonic transmitter 7A-7D operates at a different frequency or on other noninterfering methods than its corresponding ultrasonic receiver 11A-11D so as to permit full duplex transmission. The stationary transmitting/receiving unit 4 may communicate via an ultrasonic link with any number of handsets. In this case, four handsets are shown, 15A-15D. Each handset, for example 15A, comprises an ultrasonic transmitter 19A and an ultrasonic receiver 20A.

Ultrasonic transmitter 7A communicates via an ultrasonic link with the ultrasonic receiver 20A contained in handset 15A. The ultrasonic transmitter 19A in handset 15A communicates via an ultrasonic link with the ultrasonic receiver 11A of the stationary transmitting/receiving unit 4. The signal received by receiver 11A is then sent to receiving summing amplifier 6 and on to the radio frequency transmitter 3 in base unit 1. Any number of additional handsets 15 can be employed by the addition of more ultrasonic transmitters 7 and receivers 11 to stationary transmitting/receiving unit 4. These communications can take place simultaneously as the transmit and receive paths are provided by independent non-interfering methods, such as different frequencies in the ultrasonic band for each ultrasonic transmitter, time encoding or code encoding.

It will be appreciated that signals other than audio (voice) signals may be communicated between the controller in base unit 1 and handsets 15A-15D. Examples of such signals are control signals, such as telephone number to be dialed, instruction to dial, instruction to go on-hook, instruction to display information, incoming call notification, disconnect, store, and recall. These signals may also be communicated via the ultrasonic transmitter/receivers 7, 11, 19 and 20. In the preferred embodiment, these signals are separated from the audio signals and are exchanged over another set of cables: ac (a-control out), and bc (b-control in). In an alternative embodiment, all signals are sent over cables a and b and signal separation is performed at base unit 1. Under either embodiment, handsets 15 perform the signal separation. Methods of sending multiple signals over a single path, such as cable a or cable b, are well known.

Control signals and audio signals may be combined and sent over the ultrasonic link, and then separated, using any of several methods: (1) the control signals and the audio signals may be converted into digital signals and sent as such over the link; (2) one of the signals could be used to modulate a subcarrier, and the other signal and the modulated subcarrier are sent over the link, preferably using frequency modulation to reduce noise problems; (3) a second set of ultrasonic transducers could be used to exchange the control information; or (4) infrared transmitters and receivers (not shown) can be used to establish an infrared link to transmit one of the signals, such as the control signals. These and other methods of sending two signals over a common link are well known.

If several handsets, or headsets if desired, 15 have the ability to send control signals, *then a device, such as a multiplexer 8, may be used to coordinate the transfer of the control signals to transmitter 3. Other methods may also be used for this purpose, such as providing a separate signal path bc from each ultrasonic receiver 11 to transmitter 3.

Figure 2:
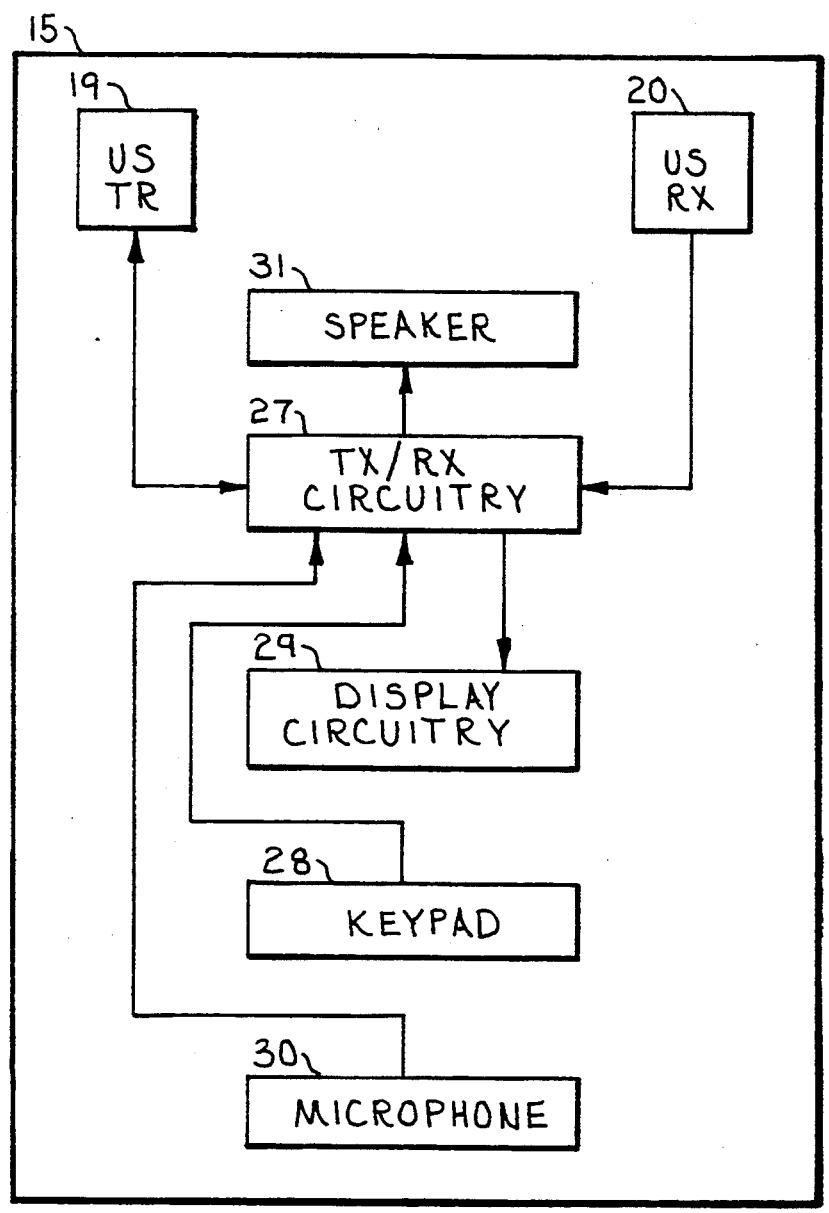
FIG. 2 is a block circuit diagram of the transmitting/receiving handset.

FIG. 2 is a block circuit diagram of the transmitting/receiving handset. A handset 15 comprises an ultrasonic transmitting unit 19, an ultrasonic receiving unit 20, transmitter and receiver circuitry 27, a keypad 28, display circuitry 29, microphone 30, and earpiece/speaker 31. Handset 15 may also have a rechargeable battery (not shown) and ringer (not shown). FIG. 2 illustrates, from bottom to top, the preferred relative positions of microphone 30, keypad 28, display circuitry 29, speaker 31, and ultrasonic transducers 19 and 20. In the preferred embodiment, transducers 19 and 20 are located at the top end of handset 15. Transmitter/receiver circuitry 27 and the battery (not shown) may be placed in any convenient location within handset 15. The transmitter/receiver circuitry 27 performs signal modulation, demodulation, transmission, and reception functions by ultrasonic means. The construction of a handset 15 is conventional and similar to that of cellular radiotelephones except that communications of handset 15 are accomplished by using ultrasonic devices 19 and 20.

A storage cradle for the handset and a charging unit for the rechargeable battery may be used and are well known in the art. The cradle, with the recharging unit, is preferably located in the center console or in an armrest in the automobile. It is not required that each handset of a multiple handset unit contain dialing or ring capabilities. Further, the ringer and other control features may be located in the cradle rather than in a handset or in the overhead unit 4.

In order to insure that the transmission is obstacle free, the ultrasonic receiving and transmitting units comprising the handsets are mounted on the top-most side of the handset, pointing upward, so that they are closest to the stationary transmitting/receiving unit 4 mounted in the dome light housing unit.

In the alternative embodiment, only one handset, such as handset 15A, provides two-way communications and the remaining handsets 15B-15D are listen-only devices. This allows other passengers to clearly hear the conversation, even though they cannot readily participate in the conversation. In this case, only a single pair 7A, 11A of transducers is required in base unit 4, summing amplifiers 5 and 6 or multiplexer 8 are not necessary. Handsets 15B-15D need not contain an ultrasonic transmitter 19, microphone 30, keypad 28, or display 29, and only demodulation circuitry would be needed in circuitry 27. If desired, the demodulation circuitry may be provided as part of ultrasonic receiver 20.

Figure 3:
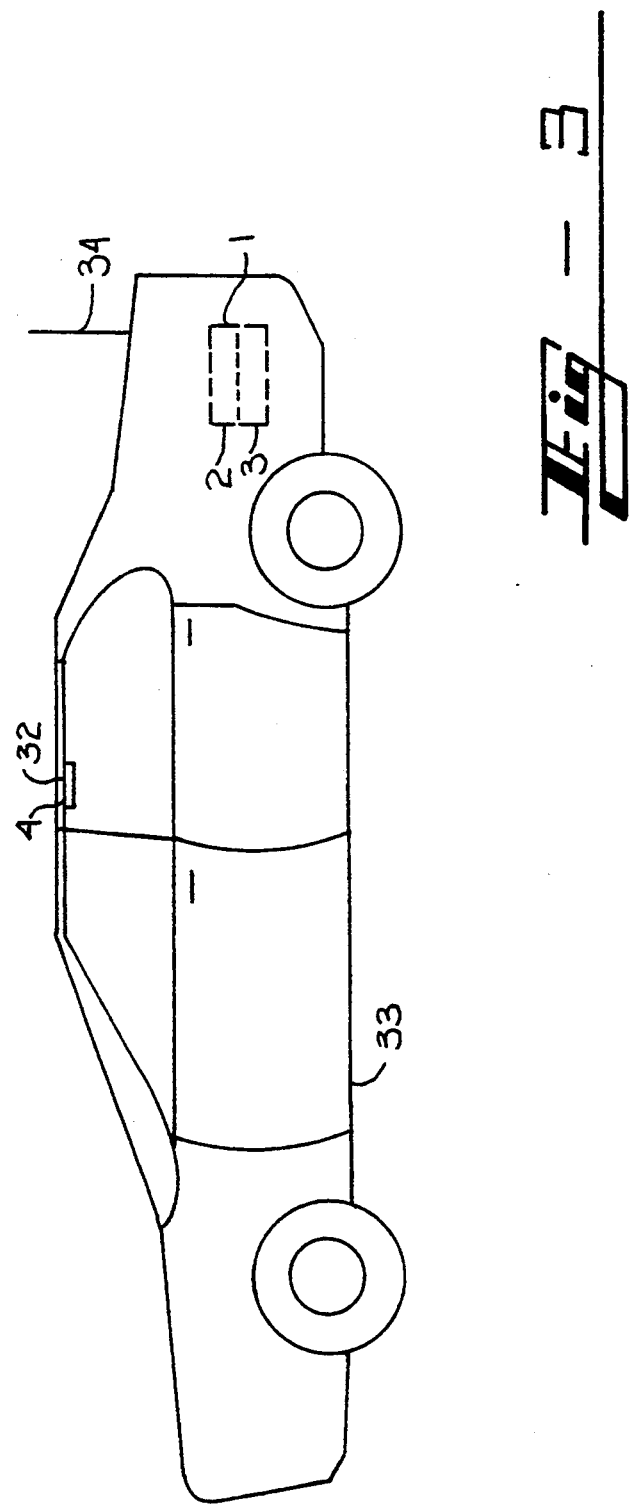
FIG. 3 shows the location of the components of the invention in an automobile.

FIG. 3 shows the location of the components of the invention in relation to an automobile. A base unit 1 comprising a radio frequency receiver 2 and a radio frequency transmitter 3 is mounted in the trunk of a vehicle 33. The radiotelephone antenna 34 is conveniently mounted on the exterior of vehicle 33. In the preferred embodiment, the stationary transmitting/receiving unit 4 would be incorporated into the dome light housing unit 32 of the vehicle 33 so as to provide for clear transmission to any location in the passenger compartment. Under normal operation, the radio frequency receiver 2 in the base unit 1 receives radio frequency signals from the mobile telephone switching office (MTSO) and demodulates those radio frequency signals to provide audio signals which are in turn sent to the stationary transmitting/receiving unit 4. Likewise, signals from stationary unit 4 are sent to the MTSO via transmitter 3.

It is to be understood that this description is not meant to be limiting because further modifications may now suggest themselves to those skilled in the art and it is intended to cover such modifications as fall within the scope of the following claims.

I claim:

1. A radiotelephone for use in an automobile, comprising:
   a base unit for receiving first combined outgoing audio signals and transmitting an outgoing radio frequency signal, and for receiving incoming radio frequency signals and providing incoming audio signals;
   a transmitting/receiving unit mounted within the dome light housing unit of said automobile, functionally connected to said base unit and comprising two ultrasonic receivers and two ultrasonic transmitters, each ultrasonic receiver for receiving incoming ultrasonic signals to provide outgoing audio signals and each ultrasonic transmitter for receiving second combined audio signals to provide outgoing ultrasonic signals;
   first means interposed between said base unit and said ultrasonic receivers of said transmitting/receiving unit for combining said outgoing audio signals from said ultrasonic receivers of said transmitting- /receiving unit to provide said first combined outgoing audio signals to said base unit;

second means interposed between said base unit and said ultrasonic transmitters in said transmitting-/receiving unit for combining said incoming audio signals from said base unit and said first combined outgoing audio signals to provide said second combined audio signals to said ultrasonic transmitters; and two handsets, each handset comprising a microphone, a speaker, an ultrasonic transmitter located on a predetermined end of said handset for transmitting signals from said microphone as said incoming ultrasonic signals to said transmitting-/receiving unit, and an ultrasonic receiver located on said predetermined end of said handset for simultaneously receiving said outgoing ultrasonic signals from said transmitting/receiving unit to provide said second combined audio signals to said speaker, each said handset being associated with a predetermined ultrasonic transmitter and a predetermined ultrasonic receiver of said transmitting-/receiving unit so that both said handsets may be used simultaneously.

2. The radiotelephone of claim 1 whereby said ultrasonic transmitter and said ultrasonic receiver of said handset comprise piezo-electric devices.

3. The radiotelephone of claim 1 whereby said ultrasonic transmitter and said ultrasonic receiver of said transmitting/receiving unit comprise piezo-electric devices.

4. The radiotelephone of claim 1 and further comprising a listen-only handset consisting essentially of a speaker and an ultrasonic receiver for receiving said outgoing ultrasonic signals from said transmitting-/receiving unit to provide audio signals to said speaker.

* * * * *